(12) United States Patent
Tsai

(10) Patent No.: US 6,274,810 B1
(45) Date of Patent: Aug. 14, 2001

(54) CAPACITOR MODULE FOR CAR AUDIO SYSTEM

(75) Inventor: Liao-Tai Tsai, Taipei (TW)

(73) Assignee: Real Power Cap Company, Taipei (TW)

( * ) Notice: Subject to any disclaimer, the term of this patent is extended or adjusted under 35 U.S.C. 154(b) by 0 days.

(21) Appl. No.: 09/436,260

(22) Filed: Nov. 9, 1999

(51) Int. Cl.$^7$ .................................................. H02G 3/08
(52) U.S. Cl. ........................ 174/50; 174/17 R; 174/50.5
(58) Field of Search ........................... 174/17 CT, 17 R, 174/17.05, 17.06, 23 R, 50, 52.3, 50.5, 50.51, 60, 50.56

(56) References Cited

U.S. PATENT DOCUMENTS

| | | | |
|---|---|---|---|
| 3,517,275 | * | 6/1970 | Kreidler et al. ........................ 174/50 |
| 3,599,134 | * | 8/1971 | Galloway ............................... 174/50 |
| 3,731,130 | * | 5/1973 | Dutta .................................... 174/52.3 |
| 3,778,683 | * | 12/1973 | Buice et al. ........................ 174/52.3 |
| 3,825,148 | * | 7/1974 | Hunter et al. ........................ 174/52.3 |
| 3,986,083 | * | 10/1976 | Carino .................................. 174/52.3 |
| 4,342,070 | * | 7/1982 | Evans ................................... 174/52.3 |
| 4,538,025 | * | 8/1985 | Coe et al. ............................ 174/52.3 |
| 5,381,301 | * | 1/1995 | Hudis ................................... 174/52.3 |
| 5,837,933 | * | 11/1998 | Fligelman ............................. 174/50 |
| 6,066,803 | * | 5/2000 | Hagarty ................................ 174/50 |
| 6,137,053 | * | 10/2000 | Andou et al. ..................... 174/50.56 |
| 6,147,304 | * | 11/2000 | Doherty ................................ 174/50 |

\* cited by examiner

Primary Examiner—Dean A. Reichard
Assistant Examiner—Angel R. Estrada
(74) Attorney, Agent, or Firm—Birch, Stewart, Kolasch & Birch, LLP

(57) ABSTRACT

A capacitor module which is easy to install on a car and does not need any other assistant bracket or fixer for supplying power of car audio is disclosed. A capacitor module which can securely prevent leakage of the dielectric fluid contained therein is also disclosed. Furthermore, it provides a new structure distinctively different from the conventional ones and a polygon body, which can be fixed to a car at any side surface without using other assistant bracket or fixer. In addition, the sealing process will lock up parts of the capacitor instead of deforming the parts in order to provide a higher sealing quality.

8 Claims, 6 Drawing Sheets

CAPACITOR MODULE FOR CAR AUDIO SYSTEM

BACKGROUND OF INVENTION

1. Field of the Invention

The present invention relates generally to a capacitor module for car audio system. More particularly, the present invention relates to a capacitor module which is applied in a car audio system and is fixed thereon without any other assistant brackets.

2. Related Art

A car's power system is normally supplied by a car's battery. However, there are always some capacitors installed thereon to meet the demands of large amount current of the audio system so as to perform a better output.

As seen in FIG. 1, it is a conventional capacitor you can find everywhere, which is fix on somewhere in a car to supply power needed by an audio system. We can find that the capacitor is a cylinder in its appearance. Therefore, it is always rolling while fixing it. In this case, an assistant bracket or a certain kind of fixer are introduced to hoop it at the location of bottom or middle sections. The assistant bracket or fixer are then fixed on the car. Though the capacitor is fixed on the car, the surface thereon hidden under the bracket or fixer, and the indicating figures and text printed thereon are hidden as well. The indicating figures and text which show the notices and warning messages, therefore, can not fully show up, and are hard to read them.

Moreover, it is also inconvenient to assembly the capacitor by utilizing the bracket and the fixer. The reason is that the capacitors are not the same size in diameter. So we are always bothered to find out the correct size of brackets or fixers to meet them firmly. Furthermore, in comparison with the assembling activities between them, we have two elements to fix on the car and should perform two steps, firstly, fix the bracket or the fixer on car and, secondly, fix capacitor on them. The fixing procedure is complicated.

Besides, the bracket or fixer and the capacitor are individual elements. Though we had fixed them firm enough, we thought at that time, the continuing shocking force caused by moving of the car is sufficient to loosen them despite of how tightly they are installed. After a period of time, it comes more difficult to we can firmly believe they are still firmly fixed together.

According to forgoing description about the assembly of the capacitor, there are also some features to be improved. In addition, the airtightness of the capacitor must be very much considered during manufacture process to prevent the leakage of the dielectric fluid inside it. As shown in FIG. 2A and 2B, the conventional manufacture process of capacitor 1a is mainly to form a cylinder with an opening 13a on top for receiving the dielectric fluid, to seal the open with a bakelite, to put a circular rubber gasket 12a at outer ring 11a, to press the materials on the ring together by a shaft 15a and 14a roller processing a circular motion along the ring 11a and finally seal the dielectric fluid inside. The foregoing sealing method needs a very precise operation while practicing the rolling process. That is, in case of dislocation or short distance of moving down of the roller, the sealing quality of the capacitor will be affected, and the dielectric fluid may leak out from the gap formed by the foregoing cases. On the contrary, if the roller moves down at a longer distance, that is, deeper, it will do damage to the capacitor, that is, the capacitor deforms.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and detailed description of the preferred embodiment in addition to the scope of the invention as defined by the claims taken in conjunction with the accompanying drawings.

SUMMARY OF THE INVENTION

Accordingly, the present invention provides mainly a capacitor module which is easy to install on a car and does not need any other assistant bracket or fixer.

Another object of the present invention is to provide a capacitor module which can securely prevent from leakage of the dielectric fluid inside.

In order to meet the object of the present invention, it provides a new structure distinctively different from the conventional ones and a polygon body, which can be fixed to a car at any side surface without using other assistant bracket or fixer. In addition, the present invention perform the sealing process by locking up parts of the capacitor instead of deforming the parts in order to provide a higher sealing quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE PREFERRED EMBODIMENT

Figure 1:
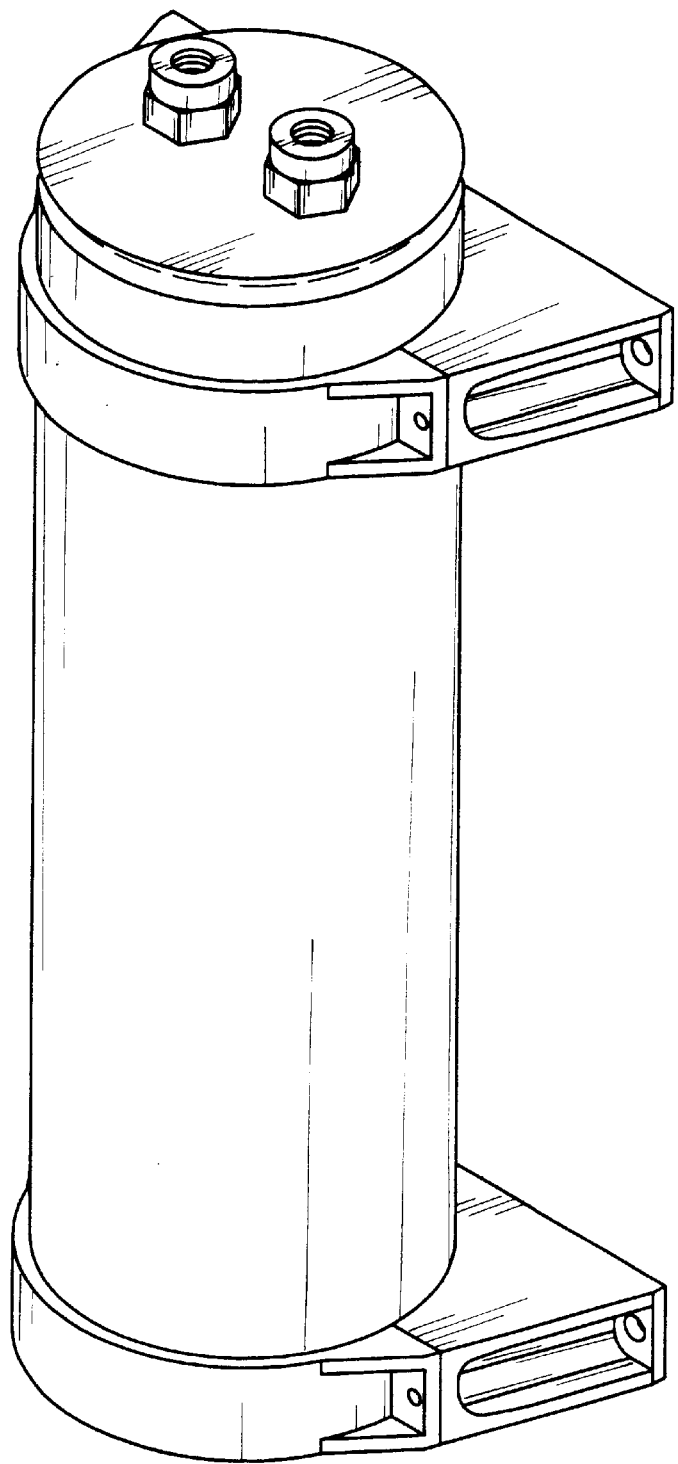
FIG. 1 is a perspective view of conventional capacitor and the bracket for fixing on a car.
Figure 2:
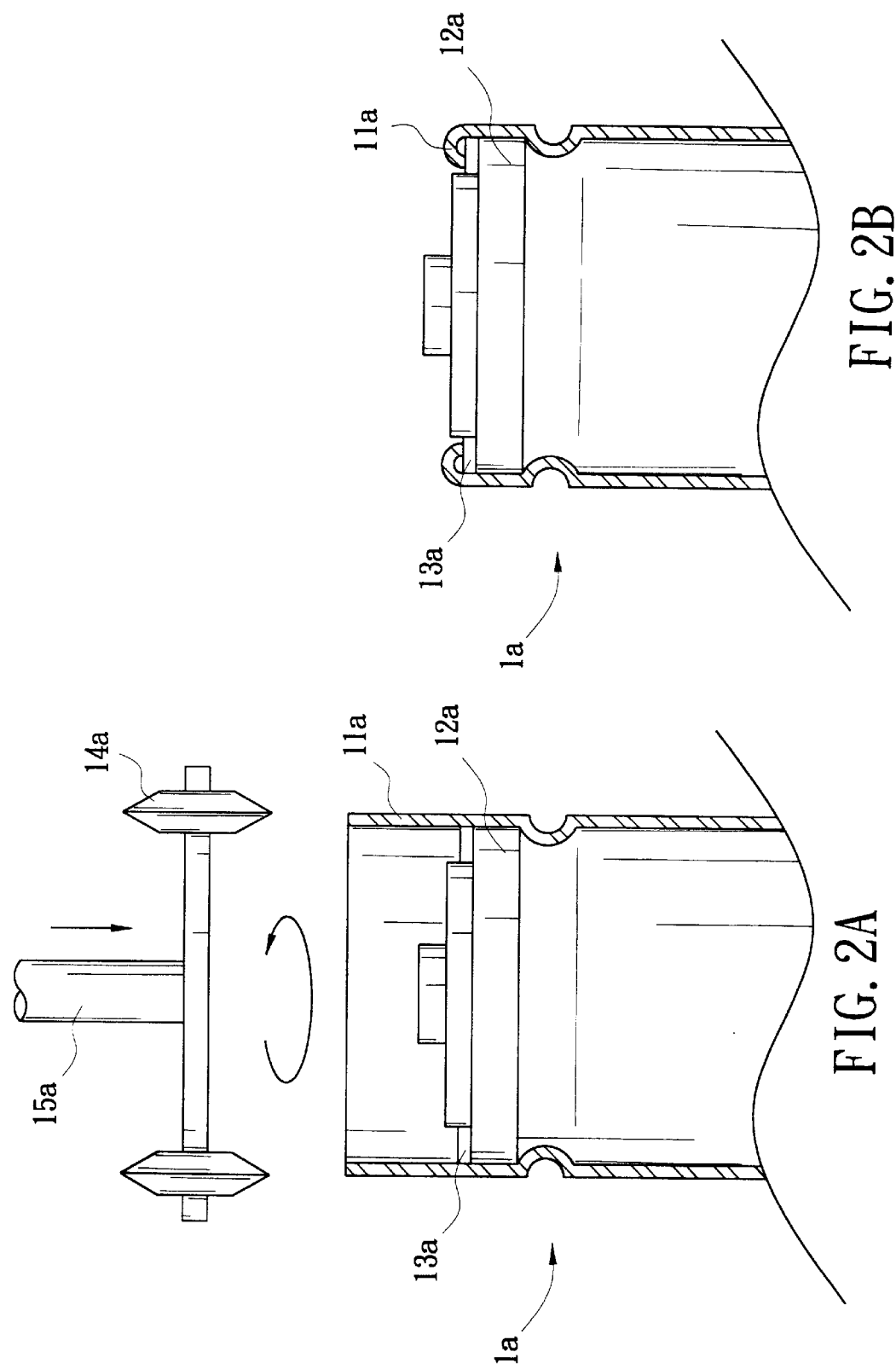
FIGS. 2A and 2B are sectional views of conventional capacitors performing the sealing processes.
Figure 3:
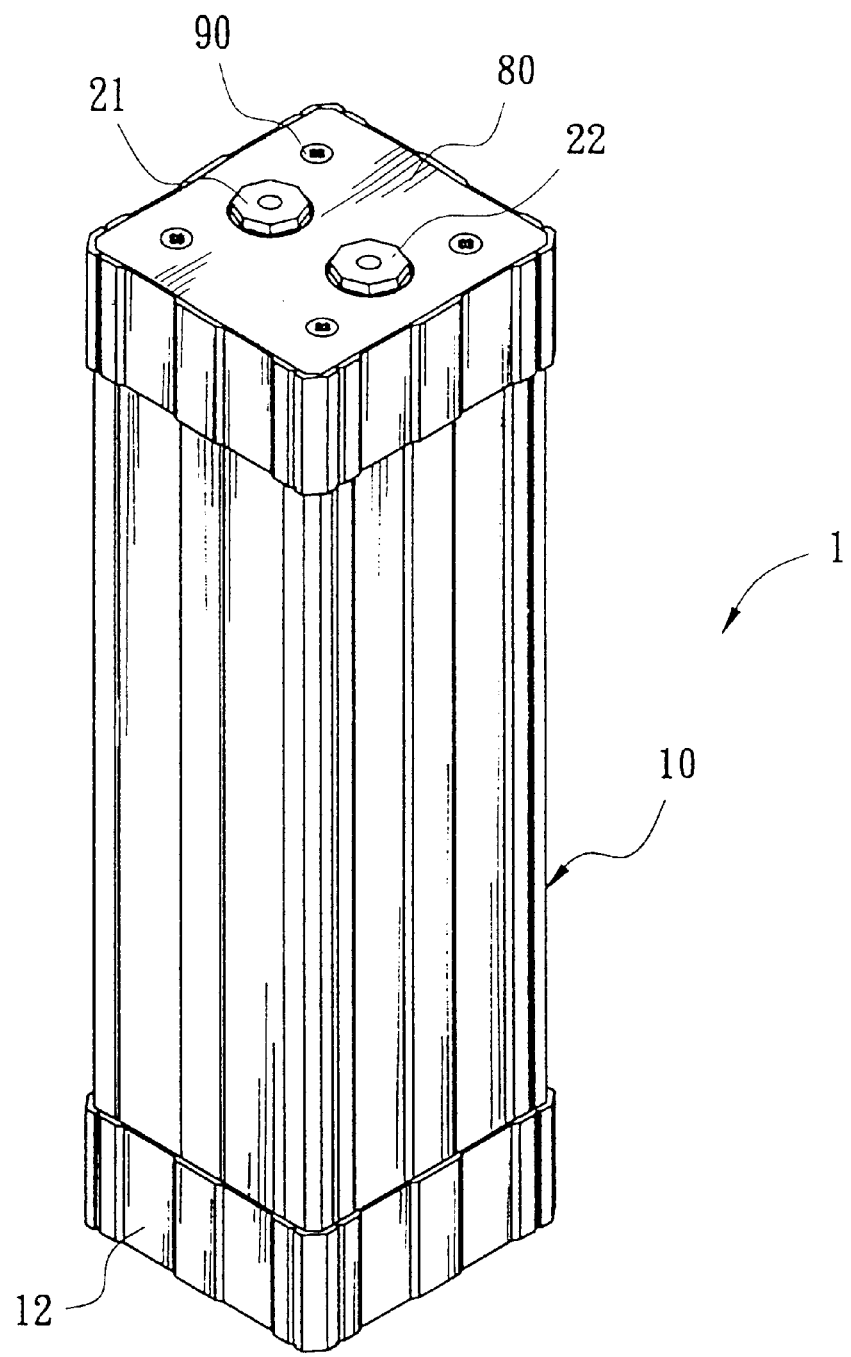
FIG. 3 is perspective view of the present invention.
Figure 4:
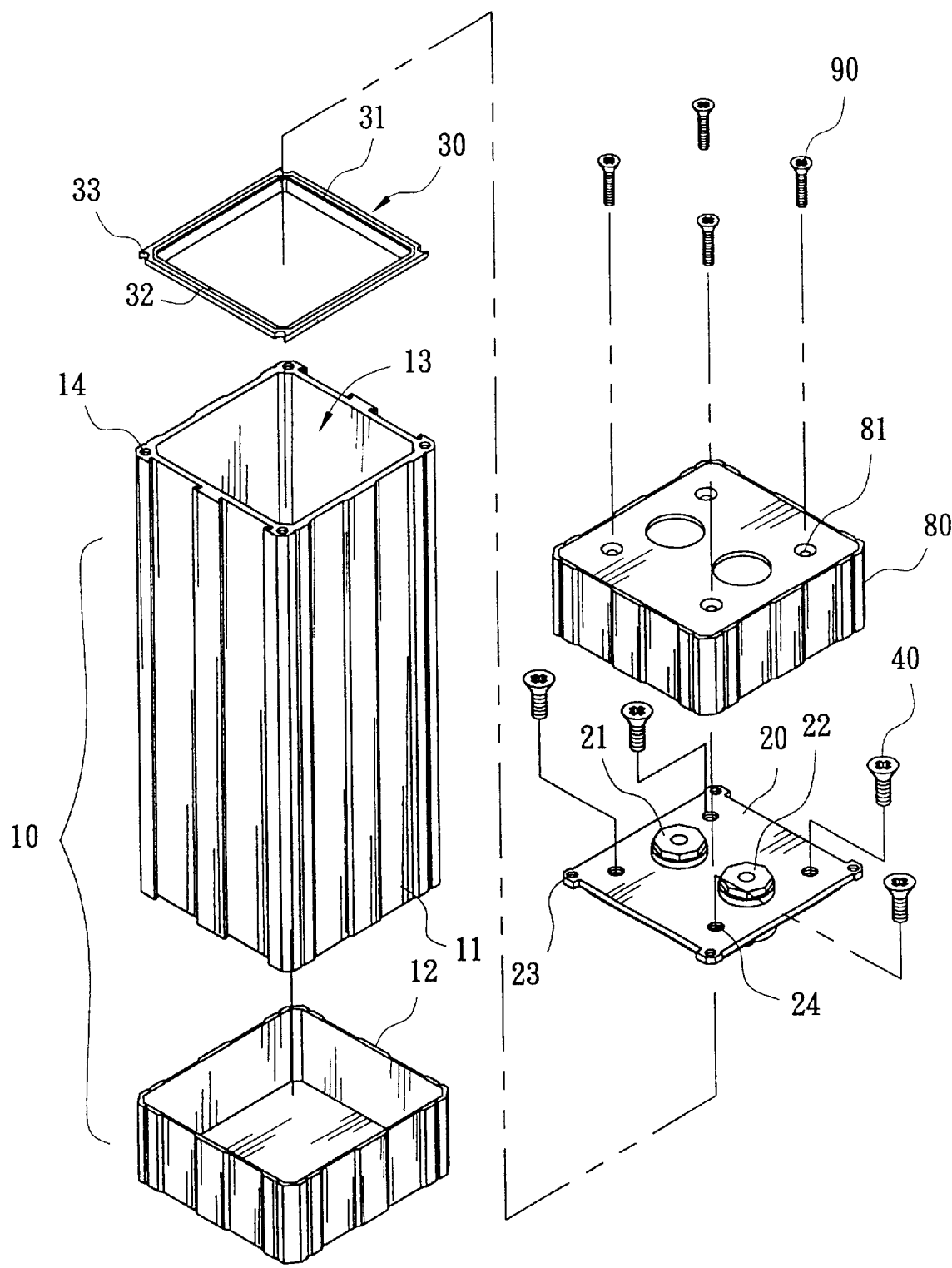
FIG. 4 is an exploded view of the present invention.
Figure 5:
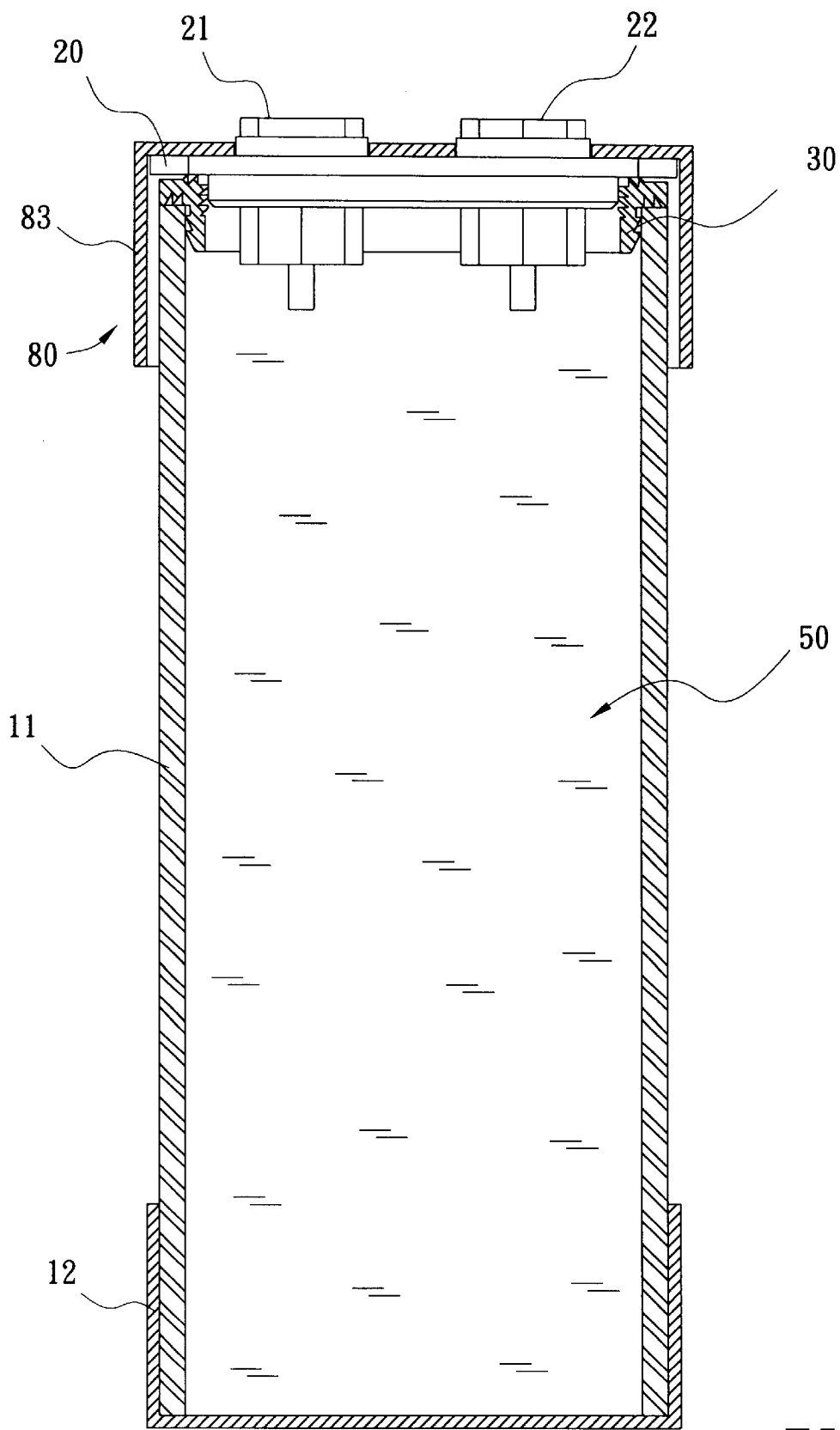
FIG. 5 is a sectional view of the present invention.

Firstly, referring to FIG. 3, 4 and 5, an embodiment of the present invention provides a capacitor module 1 which comprises a body 10, a dielectric cover 20, a gasket 30 and a plurality of locking parts 40 for assembling the body 10, the dielectric cover 20 and the gasket 30 together.

The body 10 is further composed of a polygonal shell 11 which is a hollow polygon and a bottom cover 12 for being sealed to the open face of the bottom of the polygonal shell 11 to form a cup body with an upper opening 13 which is provided for filling the dielectric fluid 50 into the inner space of the body 10. The dielectric cover 20 has two electric terminals 21 and 22 thereon, which is provided to cover the upper opening 13 and fully seals the upper opening 13 to form a sealed body together with the body 10. The gasket 30 is a circular ring and is made of rubber material, which is flexible and has protrusions 31 and 32 raising from the outer surface along the circular ring.

The gasket 30 is designed to cover the ring of the upper opening 13 of the body 10, providing that the gasket 30 is just located between the dielectric cover 20 and the polygonal shell 11 while assembling them and the protrusions 31 and 32 are pressed on the contact surfaces of the dielectric cover 20 and the polygonal shell 11 separately to form two stop-leaking lines along the contact surfaces for preventing the dielectric fluid 50 from leaking out of the capacitor 1, as shown in FIG. 5.

There are locking holes 14 and 23 which are located at the body 10 and the dielectric cover 20 separately and match each other in position. The locking holes 14 and 23 are provided for the locking parts 40 to go through and lock the body 10 and the dielectric cover 20 together, of course, the gasket 30 is located between them and also has hole 33 matches the foregoing locking holes 14 and 23 and provides a fixed position in order not to deform improperly during assembling the body 10 and the dielectric cover 20 together.

Figure 6:
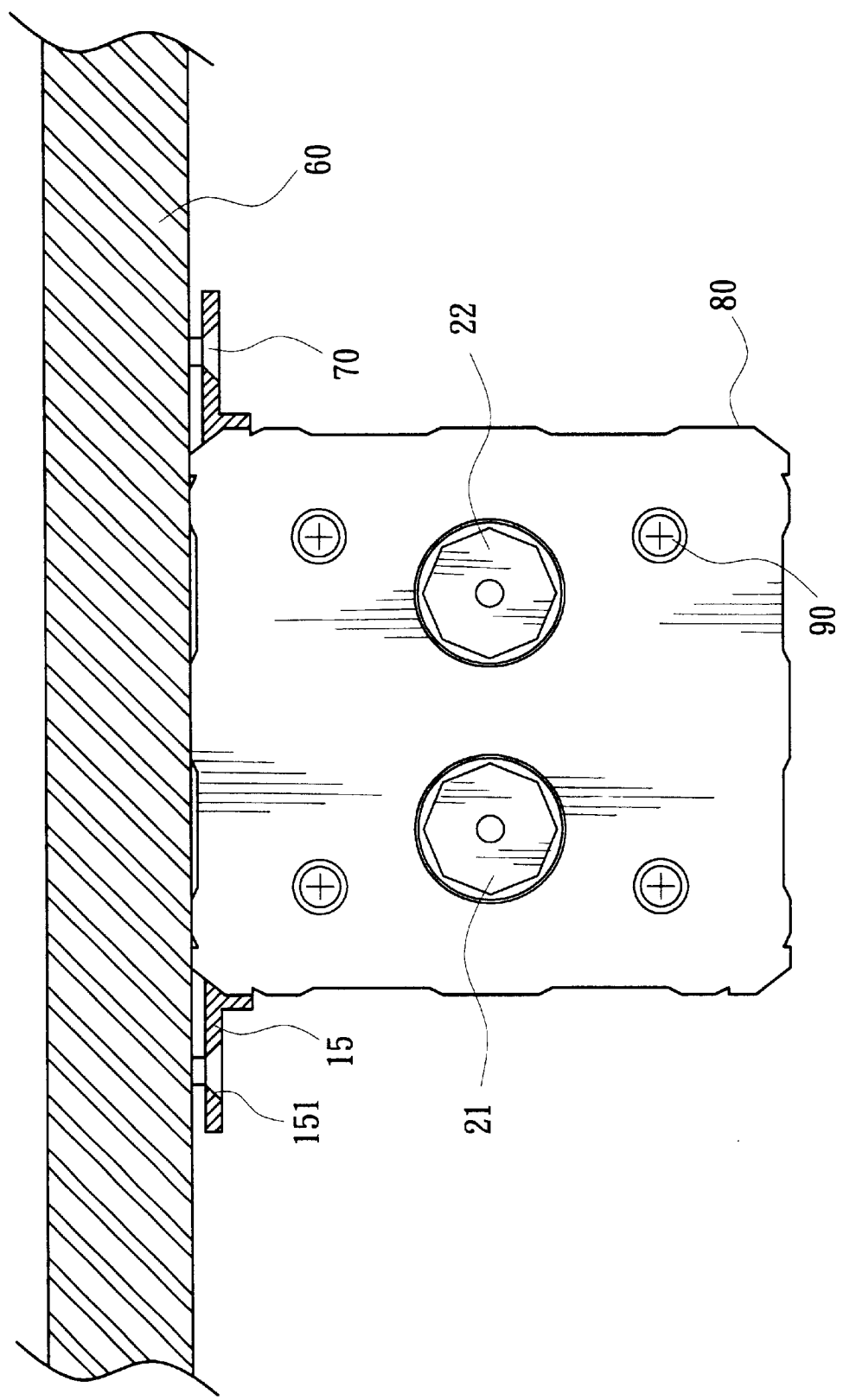
FIG. 6 is a sectional view of an embodiment of the present invention, depicting the practicing status.

Referring to FIG. 6, the capacitor 1 of the present invention is fixed to a car, not shown. Because the exterior of the capacitor is a polygonal body, it can be fixed on the plate 60 of the car at any surface plane. At least one fixing portion 15 is extended from the side surface of the body 10 for affixing the body 10 to the plate 60. The fixing portion 15 further has a bolt hole 151 provided for a bolt 70 to go through and lock the fixing portion 15 to the plate 60, consequently, the capacitor is fixed on a car. In comparison with the conventional installation of a capacitor which utilizes an assistant bracket, the present invention makes it easier and simpler and will not affect the reading of the text or figures printed thereon.

Referring to FIGS. 4 and 5, again, in order to connect an additional upper cover 80 sealing over the dielectric cover 20, the upper cover 80 and the dielectric cover 20 have connecting holes 24 and 81 which match each other and are provided for a connecting part 90 to go through and connect the upper cover 80 and the dielectric cover 20 together. The upper cover 80 extends downward a side shield 83 from its outer ring, which can protect the contacting areas of the body 10, the dielectric cover 20 and the gasket 30 to prevent them from gathering of dirt and oil thereon.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A capacitor module for a car audio system, comprising:
    a cup-shaped body having an opening through which dielectric fluid is filled into the body;
    a dielectric cover sealable to the opening of the body to form a sealed body; and
    a flexible gasket with a seal which is formed between the body and the dielectric cover for preventing leakage of the dielectric fluid from the sealed body; and
    an upper cover having a shield extending downwardly from an outer edge thereof, the shield covering a portion of the sealed body to protect the portion of the sealed body, the gasket and the dielectric cover and to prevent gathering of dirt and oil.

2. The capacitor module for a car audio system as recited in claim 1, wherein said body comprises a polygonal shell and a bottom cover connected at a bottom of the polygonal shell.

3. The capacitor module for a car audio system as recited in claim 1, wherein both the body and the dielectric cover have matching locking holes through which a locking element is passed in order to combine the body with the dielectric cover.

4. The capacitor module for a car audio system as recited in claim 3, wherein a plurality of locking holes are provided in both the body and the dielectric cover to provide pairs of locking holes and wherein a locking element is provided for each of the pairs of locking holes.

5. The capacitor module for a car audio system as recited in claim 1, wherein the seal of the gasket includes at least one protrusion extending outwardly from the gasket, the at least one protrusion contacts at least one of the body and the dielectric cover.

6. The capacitor module for a car audio system as recited in claim 1, wherein both the upper cover and the dielectric cover have matching connecting holes through which a connecting element is passed in order to combine the upper cover with the dielectric cover.

7. The capacitor module for a car audio system as recited in claim 5, wherein a plurality of connecting holes are provided in the upper cover and a plurality of locking holes are provided in the dielectric cover to provide pairs of holes and wherein a locking element is provided for each of the pairs of holes.

8. The capacitor module for a car audio system as recited in claim 1, wherein the body further has at least one fixing portion extending outwardly from a side surface thereof for fixing the body to a car.

* * * * *